July 28, 1964
M. E. ART
3,142,142
COTTON BOLL OPENER
Filed July 3, 1961
FIG. 1.
FIG. 2.
FIG. 3.
FIG. 4.
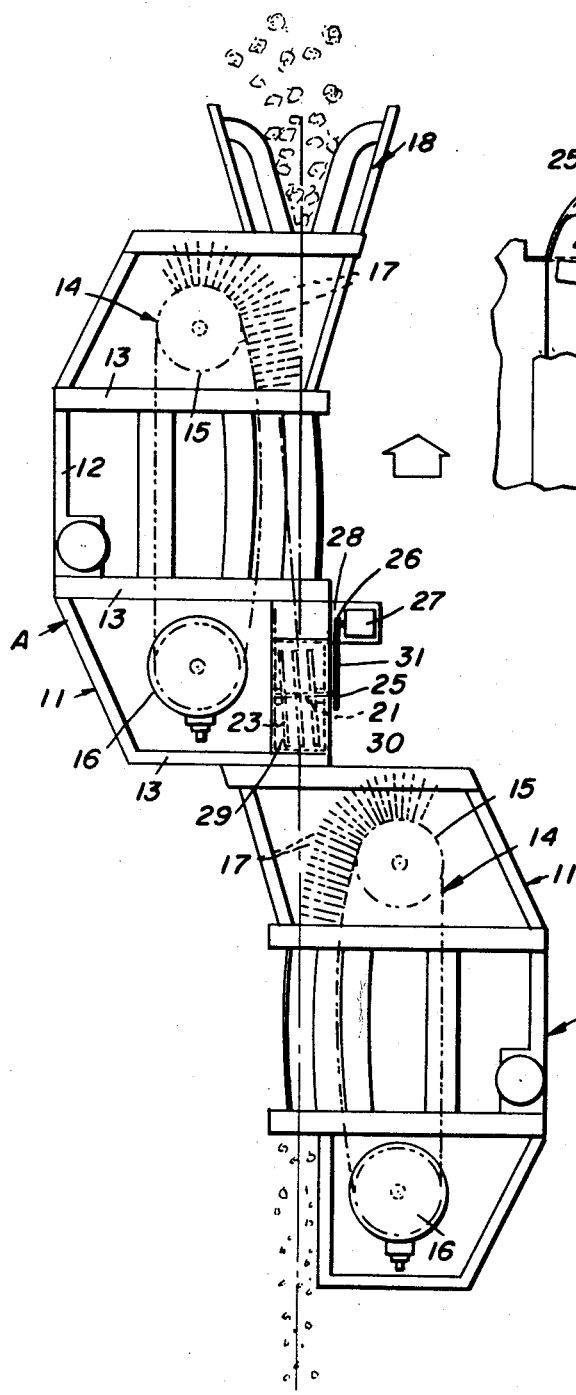
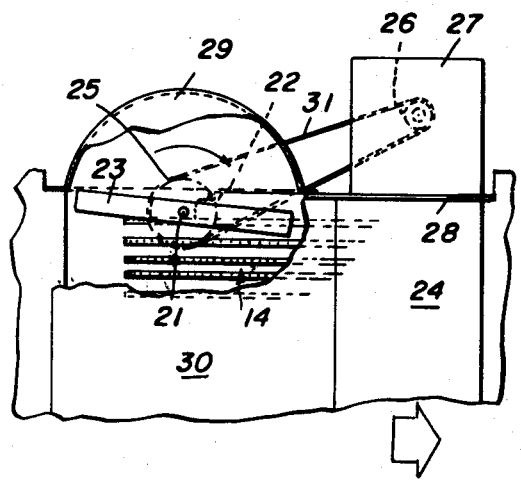
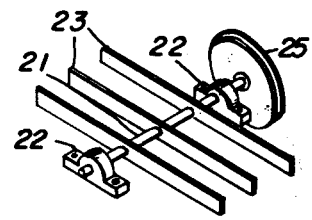
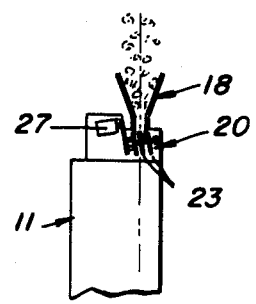
INVENTOR
MARVIN E. ART
BY
ATTORNEY United States Patent Office 3,142,142
Patented July 28, 1964

3,142,142
COTTON BOLL OPENER
Marvin E. Art, 3007 Bucknell St., Bakersfield, Calif.
Filed July 3, 1961, Ser. No. 121,628
4 Claims. (Cl. 56—41)

This invention relates to a device for use on mechanical cotton pickers to open the bolls or pods which have not naturally opened to expose the cotton. Under certain growing and maturing conditions many of the pods or bolls on cotton stalks in the field do not naturally open so as to expose the ball of cotton fibers and the seeds. For this reason there is wastage of cotton due to the fact that the mechanical pickers which are now commonly used for harvesting fail to collect the cotton fiber which is in the unopened pods. It is customary to machine pick the cotton fields several times with an interval in between pickings to allow more of the cotton pods to mature and naturally open, but even this procedure fails to get all of the cotton in the field because of the unopened pods. My invention solves the problem of collecting the cotton in the naturally unopened pods by mechanically breaking or opening the mature pods which do not naturally open under field conditions, usually simultaneously with the final field picking. It has been found that mature but naturally unopened pods, open up when struck sharply, an operation well described in the field term of "popping open" the pods. It is unnecessary to actually break away the pod covering because after the sharp impact, the pod opens to expose the cotton in much the same way as the naturally opened pods.

My device may be attached to any one of several standard mechanical cotton pickers of the type which move through the field and gather the cotton fibers from the open bolls. These machines in doing this gather together the stalks bearing the bolls into a narrow vertical channel where revolving mechanical fingers of one kind or another pick off the cotton fibers from the opened bolls and leave the machine with stalks standing as they were in the rows, but pressed together, the stalks having some branches, some leaves, empty pods, and unopened pods, but being generally standing erect in the original rows. At this point, my opening device impacts the unopened pods, and they open up so that other spindles pick the fiber.

One such machine, known as the "Rust" cotton picker, is commonly used in California fields, and is arranged in several forms, including one for picking either one or two rows at a time, or for picking one row with two pickers in tandem. In the following description of my invention the "Rust" self-propelled cotton picker is used to illustrate the application of my invention, but it will be understod that other mechanical cotton pickers of the general type described may also be used. My invention consists of an attachment which is mounted either ahead of the cotton fiber picking device, or, where the pickers are arranged in tandem, which is my preferred arrangement, my attachment is mounted in alignment with the row of cotton stalks, between the two mechanical picker devices.

The principal object of the invention is to make available the cotton fibers which are enclosed in unopened but mature cotton bolls or pods, and without serious injury to the stalks of the cotton plant. Another object is to open by impact the unopened mature pods containing cotton fibers and seeds which have not naturally opened. Another object is to provide means to be used in conjunction with mechanical cotton pickers which makes sharp impact on the unopened pods so that they "pop" open to expose the cotton ball, resulting in increased recovery of cotton fiber and seeds. A still further object is to provide an attachment to mechanical cotton picker machines which "pops" open the unopened pods and strips the stalks of the cotton plants of leaves and small branches so that the stalks may be separately harvested for recovery of the fiber content of the stalks. My invention will be understood from the following description, reference being made to the accompanying drawings in which FIGURE 1 is a plan view of a tandem arrangement of rotating spindle cotton pickers showing my pod opener attachment;

FIGURE 2 is an enlarged side elevation, with parts broken away and shown in section, of my pod opener as mounted upon the tandem cotton picker of FIGURE 1;

FIGURE 3 is a perspective view showing my opener attachment;

FIGURE 4 is a plan view showing the front portion of a single cotton picker with my pod opener attachment mounted on the front of the machine between the stalk gatherer and the fiber gathering spindles.

In the drawings, particularly FIGURE 1, I have shown mechanical cotton pickers of the variety known as the "Rust" cotton pickers. In FIGURE 1 there is shown a tandem arrangement of two individual pickers, the details of the carriage, collecting baskets, blowers, pneumatic conveyors, gasoline engine drive and other details being omitted for clarity leaving, only outlined the vertically disposed wide conveyor which carries the rotary spindles upon which the cotton fiber is gathered, the gatherer on the front, and parts of the supporting frame.

Each picker is mounted on a frame 11 which consists of vertical members 12 and horizontal members 13, only such portion of the frames being shown as is necessary to support the spindle conveyors and other elements cooperating with my pod breaking attachment. The conveyor 14 passes around end pulleys 15 and 16, the conveyor outside face being disposed vertically with the fiber collecting spindles protruding horizontally from said face. The cotton plant stalks with the open and unopened bolls or pods are brought together into a narrow vertical channel by the gatherer 18 on the forward end of the machine and the stalks then pass adjacent the protruding spindles 17 so that no matter where the open cotton bolls may be located vertically on the stalk, they come in contact with spindles which are rotating, which ensnare and wind up the cotton fibers. The conveyor is usually moved independently of the ground movement of the machine along the row of plants in the field so that fresh spindles are being brought toward the forward end, while the spindles which approach the rear end pulleys 16 are automatically stripped of the collected cotton fiber and make a return pass around the pulleys. The cotton and the trash are picked up by pneumatic means, (the details of which are not shown), and the stalks with some empty pods and unopened pods attached, pass from the forward picker A to the rear or second picker B.

Between the two pickers and disposed in the line of travel of the stalks is placed the pod opener attachment of my invention. The pod opener consists of a shaft 21 mounted horizontally on horizontal frame members 13, in bearing blocks 22. Affixed to the shaft 21 for rotation therewith are a plurality of rectangular bar stock beater arms 23 which are spaced apart to make impact with the pods attached to the cotton stalks as they leave the narrow channel formed by the crowder door 24 and the hanging plate 30 of the first picker A and pass into the narrow channel defined by the hanging plate 30 and the crowder door 24 of the second picker B. A drive sheave 25 is keyed to the shaft 21 for rotating the beater arms, this sheave being operatively connected by the belt 31 to the motor sheave 26 of the motor 27 which is independent of the main drive of the picker assembly. The motor 27 is mounted on a plate 28 which is held by the horizontal frame members 13. The axis of the shaft 21 is preferably disposed at a slight angle from perpendicular to the line of travel of the machines and stalks. It has been found that this angular displacement of the axis of the shaft is somewhat critical to the functioning of the beater arms. The angular offset is in the range from two to six degrees, preferably being about four degrees. It has been determined that when the displaced angle is greater than the range given that the beater arms produce much fiber and debris by breaking up the stalks, which winds up on the shaft, and when the angular displacement is less than the range given the beater arms are not very effective to "pop open" the unopened pods on the stalks. When the beater arms are rotated in a plane parallel to the line of travel, the beater arms are ineffective to break a majority of the pods which have not naturally opened.

The direction of rotation of the beater arms is arranged so that the broken off pods and branches of the stalks are swept rearwardly and upwardly. The stalks and opened pods move past the spindles 17 of the second picker B which entangle the cotton fibers and collect the cotton from the opened pods. The cotton and debris are picked up by the pneumatic system. The stalks after passing through the second picker B are relatively clean and free from leaves, branches and pods, and are left standing in rows in the field where they may be harvested separately as a source of paper fiber.

The preferred number of beater arms is three, so spaced and of such length that all the pods on the stalks may be struck one or more times. The speed of rotation is not very critical, but with 14-inch (total length) bars a speed of about 1400 r.p.m. has been found to give good results.

The pod breaking arms may for safety be enclosed by a hood 29.

In FIGURE 4 there is shown the manner of attaching my pod opener device to a single cotton picker machine. In this arrangement the pod opener is attached ahead of the spindle conveyor and following the gatherer which brings the stalks with the pods to a narrow channel as they pass through the picker machine. The pod opener 20 is constructed and aligned as described above for the tandem picker arrangement, being mounted on the horizontal members 13 of the picker. The pod opener attached to a single picker machine is used in practice in the field to gather the cotton from the unopened pods which remain after the field has been picked in the usual way. Not only is the amount of cotton fiber recovered increased by as much as 20 percent but the cotton plant stalks are in the operation stripped of the debris which is undesirable when the stalks are subsequently harvested and used for producing paper pulp.

It will be understood that my pod breaker may be similarly attached to mobile cotton pickers of other types than the one shown and described herein, the requirement being that the pod opener by positioned so that the beater arms will strike the unopened pods remaining on the stalks after the main crop of opened pods has been harvested by other machines.

The advantages will be apparent from the above description. The objectives stated in the beginning have been attained.

I claim:

1. In a cotton picker machine of the type having fiber-engaging fingers for picking the fibers from the opened bolls attached to the stalks, said machine having means for channelling upright cotton stalks with ripe but unopened pods into a narrow vertical channel, a pod opener device comprising rigid spaced apart beater arms arranged to rotate on a horizontal axis in a vertical plane in the path of said pods while attached to the stalks, said axis being disposed angularly from a position perpendicular to the line of travel of said cotton picker machine; and means for rotating said device.

2. The device defined in claim 1 in which the angular deviation of the horizontal axis from perpendicular to the line of travel of the picker machine is in the range from 2 to 6°.

3. In a cotton picker machine of the type having fiber-engaging fingers for picking the fibers from the opened bolls attached to the stalks, said machine having means for channelling upright cotton stalks with ripe but unopened pods into a narrow vertical channel, a pod opener device comprising rigid beater arms arranged to rotate in a vertical plane in the path of said pods while attached to the stalks, the plane of rotation of said beater arms being disposed at an angle of not more than 6° from the vertical plane defined by said channel; and means for actuating said beater arms.

4. In combination, a mobile cotton picker of the type having a fiber picker including engaging fingers for picking the fibers from the opened bolls attached to the stems, means defining a relatively narrow vertical channel into which the upright cotton stalks are directed, and a cotton pod opening device, said pod opening device consisting of rigid beater arms arranged to rotate in a vertical plane disposed at an angle in the range from 2 to 6° from the vertical plane defined by said channel, said opening device being disposed ahead of said picker.

References Cited in the file of this patent

UNITED STATES PATENTS

| | | |
|---|---|---|
| 2,058,514 | Rust et al. | Oct. 27, 1936 |
| 2,387,004 | Berry | Oct. 16, 1945 |
| 2,652,676 | Rust | Sept. 22, 1953 |
| 2,654,201 | Hyman | Oct. 6, 1953 |
| 2,665,537 | Rust | Jan. 12, 1954 |
| 2,674,078 | Stukenborg et al. | Apr. 6, 1954 |
| 2,682,141 | Ellis | June 29, 1954 |
| 2,746,228 | Foster | May 22, 1956 |
| 2,760,324 | Stukenborg et al. | Aug. 28, 1956 |
| 2,854,802 | Morgan | Oct. 7, 1958 |
| 2,912,810 | Lense | Nov. 17, 1959 |